United States Patent
Megdal et al.

(10) Patent No.: US 9,645,223 B2
(45) Date of Patent: May 9, 2017

(54) UNDERWATER ACOUSTIC NAVIGATION SYSTEMS AND METHODS

(71) Applicant: SHB Instruments, Inc., Northridge, CA (US)

(72) Inventors: Barry Megdal, Northridge, CA (US); Hans Scholze, San Diego, CA (US)

(73) Assignee: SHB Instruments, Inc., Northridge, CA (US)

( * ) Notice: Subject to any disclaimer, the term of this patent is extended or adjusted under 35 U.S.C. 154(b) by 605 days.

(21) Appl. No.: 14/155,669

(22) Filed: Jan. 15, 2014

(65) Prior Publication Data
US 2014/0126334 A1    May 8, 2014

Related U.S. Application Data

(62) Division of application No. 13/969,363, filed on Dec. 15, 2010, now Pat. No. 8,654,610.

(Continued)

(51) Int. Cl.
*G01S 3/80*    (2006.01)
*G01S 3/808*   (2006.01)
(Continued)

(52) U.S. Cl.
CPC .......... *G01S 3/8083* (2013.01); *G01S 5/0045* (2013.01); *G01S 5/30* (2013.01); *G01S 11/14* (2013.01); *H04B 11/00* (2013.01)

(58) Field of Classification Search
USPC ....................................................... 367/117
See application file for complete search history.

(56) References Cited

U.S. PATENT DOCUMENTS 3,222,634 A * 12/1965 Foster ..................... G01S 3/808
                                                        166/353
3,421,138 A *  1/1969 Moulin .................. G01S 3/808
                                                        367/127
(Continued)

FOREIGN PATENT DOCUMENTS

DE    100 29 456 A1    9/2001
FR    2 930 649 A1    10/2009
(Continued)

OTHER PUBLICATIONS

International Search Report, PCT/US2010/060509, dated Dec. 15, 2010.

(Continued)

*Primary Examiner* — James Hulka
(74) *Attorney, Agent, or Firm* — Knobbe, Martens, Olson & Bear, LLP

(57) ABSTRACT

An acoustic underwater navigation system is disclosed. For instance, an underwater receiver determines its position using signals broadcast from an array of acoustic transmitters located near the surface. The position of the array is measured using global positioning system (GPS) technology and the transmitters collectively produce an acoustic signal in which the position and attitude of the array and the GPS time of transmission are encoded. An underwater receiver which is synchronized with the GPS time uses the transmitted position and attitude of the array and the transmission time information to calculate its position.

20 Claims, 8 Drawing Sheets

Related U.S. Application Data

(60) Provisional application No. 61/287,144, filed on Dec. 16, 2009.

(51) Int. Cl.
*G01S 5/00* (2006.01)
*G01S 5/30* (2006.01)
*G01S 11/14* (2006.01)
*H04B 11/00* (2006.01)

(56) References Cited

U.S. PATENT DOCUMENTS

| | | | |
|---|---|---|---|
| 3,461,421 A * | 8/1969 | Stover | G01S 5/0009 367/124 |
| 3,469,231 A * | 9/1969 | Geiling | B63C 11/26 128/201.19 |
| 3,475,721 A * | 10/1969 | Sutton | G01S 3/8083 367/124 |
| 3,505,638 A * | 4/1970 | Watson | G01S 3/808 367/125 |
| 3,587,038 A | 6/1971 | Massa et al. | |
| 3,660,907 A | 5/1972 | Sutherland | |
| 3,860,900 A | 1/1975 | Scudder | |
| 3,928,840 A | 12/1975 | Spindel et al. | |
| 3,944,967 A | 3/1976 | Acks et al. | |
| 3,986,161 A | 10/1976 | MacKellar | |
| 4,070,671 A | 1/1978 | Morrow | |
| 4,229,809 A | 10/1980 | Schwalbe | |
| 4,516,226 A | 5/1985 | Peynaud et al. | |
| 4,590,591 A | 5/1986 | Leroy et al. | |
| 4,870,623 A | 9/1989 | Buckley et al. | |
| 4,924,448 A | 5/1990 | Gaer | |
| 5,008,860 A | 4/1991 | Riley et al. | |
| 5,077,703 A | 12/1991 | Strauss | |
| 5,079,753 A | 1/1992 | Suggs | |
| 5,119,341 A | 6/1992 | Youngberg | |
| 5,148,412 A | 9/1992 | Suggs | |
| 5,185,725 A | 2/1993 | Kent et al. | |
| 5,241,516 A | 8/1993 | Kruchowy et al. | |
| 5,247,489 A | 9/1993 | Pirie | |
| 5,303,206 A | 4/1994 | Bemb et al. | |
| 5,309,408 A | 5/1994 | Bick et al. | |
| 5,331,602 A | 7/1994 | MacLaren | |
| 5,570,323 A | 10/1996 | Prichard et al. | |
| 5,579,285 A | 11/1996 | Hubert | |
| 5,666,326 A | 9/1997 | Holzschuh | |
| 6,029,515 A | 2/2000 | Lahteenmaki et al. | |
| 6,272,072 B1 | 8/2001 | Wulich et al. | |
| 6,272,073 B1 | 8/2001 | Doucette et al. | |
| 6,701,252 B2 | 3/2004 | Brown | |
| 6,791,490 B2 | 9/2004 | King | |
| 6,807,127 B2 | 10/2004 | McGeever, Jr. | |
| 6,816,437 B1 | 11/2004 | Teller et al. | |
| 6,941,226 B2 * | 9/2005 | Estep | G01S 5/0063 367/131 |
| 6,972,715 B2 | 12/2005 | Hollis et al. | |
| 7,054,230 B1 | 5/2006 | Nelson | |
| 7,139,647 B2 | 11/2006 | Larsen | |
| 7,165,013 B2 | 1/2007 | Watson | |
| 7,190,634 B2 | 3/2007 | Lambert et al. | |
| 7,272,074 B2 | 9/2007 | Basilico | |
| 7,310,063 B1 | 12/2007 | Brown | |
| 7,333,394 B2 | 2/2008 | Basilico | |
| 7,362,653 B2 | 4/2008 | Green et al. | |
| 7,362,655 B1 | 4/2008 | Hester | |
| 7,483,337 B2 | 1/2009 | Basilico | |
| 7,512,036 B2 | 3/2009 | Crowell | |
| 7,650,208 B2 | 1/2010 | Basilico | |
| 7,660,189 B2 | 2/2010 | Vigen et al. | |
| 7,701,803 B2 | 4/2010 | Welker | |
| 7,778,111 B2 | 8/2010 | Hawkinson et al. | |
| 7,782,253 B1 | 8/2010 | Brown | |
| 8,509,030 B2 | 8/2013 | Napolitano et al. | |
| 8,654,610 B2 * | 2/2014 | Megdal | G01S 5/0045 367/117 |
| 2003/0078706 A1 | 4/2003 | Larsen | |
| 2005/0180263 A1 * | 8/2005 | Lambert | G01S 1/72 367/128 |
| 2005/0219950 A1 | 10/2005 | Rowe | |
| 2006/0050610 A1 | 3/2006 | Harvey, Jr. et al. | |
| 2006/0066477 A1 | 3/2006 | Hollis et al. | |
| 2006/0178829 A1 | 8/2006 | Gaiffe | |
| 2006/0196499 A1 | 9/2006 | Cannizzaro | |
| 2006/0215494 A1 | 9/2006 | Thomas | |
| 2006/0224352 A1 | 10/2006 | Baer et al. | |
| 2007/0006472 A1 | 1/2007 | Bauch | |
| 2007/0025185 A1 * | 2/2007 | Green | B63J 99/00 367/124 |
| 2007/0042706 A1 | 2/2007 | Ledeczi et al. | |
| 2007/0140057 A1 | 6/2007 | Webb et al. | |
| 2008/0034871 A1 | 2/2008 | Steimel | |
| 2008/0165617 A1 | 7/2008 | Abbot et al. | |
| 2008/0174490 A1 | 7/2008 | Ray et al. | |
| 2008/0279045 A1 * | 11/2008 | Vigen | G01V 1/303 367/99 |
| 2009/0018771 A1 | 1/2009 | Hollis | |
| 2009/0090199 A1 | 4/2009 | Hollis et al. | |
| 2009/0135022 A1 | 5/2009 | Hollis et al. | |
| 2009/0141591 A1 | 6/2009 | Basilico | |
| 2009/0171565 A1 | 7/2009 | Adams | |
| 2009/0196122 A1 | 8/2009 | Crowell | |
| 2009/0216444 A1 | 8/2009 | Crowell | |
| 2009/0295596 A1 | 12/2009 | Downey et al. | |
| 2011/0038230 A1 | 2/2011 | Napolitano et al. | |
| 2011/0141853 A1 * | 6/2011 | Megdal | G01S 5/0045 367/117 |

FOREIGN PATENT DOCUMENTS

| | | |
|---|---|---|
| JP | 63-222279 A | 9/1988 |
| JP | 07-270527 | 10/1995 |
| JP | 10-123247 | 5/1998 |
| JP | 2009-527763 A | 7/2009 |

OTHER PUBLICATIONS

Supplementary Search Report dated Mar. 30, 2016 for European Patent Application No. EP 10 84 2536.

* cited by examiner

UNDERWATER ACOUSTIC NAVIGATION SYSTEMS AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Systems and methods for underwater positioning and tracking are disclosed. In particular, an exemplary system provides an acoustic/navigation signal from a transmitter array to an underwater receiver, where the underwater receiver uses the acoustic signal to compute its absolute position.

Description of the Related Art

A problem commonly encountered underwater is an inability to accurately determine absolute position. Because high frequency radio waves do not propagate through water, direct reception of GPS or other RF signals, which would otherwise provide good positional information, is not possible. Long baseline positioning systems use multiple transponders that are placed far apart on the seafloor. Their locations must be surveyed after deployment and they must eventually be retrieved, making their use cumbersome and costly. Other systems track pings from underwater units using a receive-only ultra-short baseline (USBL) array, determine the location of the objects, and then transmit locations down to the objects using acoustic modem technology. Such systems have a limit on the number of underwater units that can be tracked by the USBL array, and such underwater units have reduced battery life and increased size because of the power used to transmit to the USBL array.

SUMMARY

An underwater acoustic navigation system and method for a plurality of submerged acoustic receivers which determine their absolute position using signals broadcast from single, compact array of acoustic transmitters located near the surface of the water is disclosed. Position and attitude of the transmit array are measured using conventional GPS/inertial/compass technology. The individual elements of the transmit array collectively produce an acoustic signal suitable for precise ranging into which the array position and attitude information and GPS time of transmission are encoded. The timing of the signal is predictable with respect to GPS time. In an embodiment, the underwater receiver comprises a hydrophone and a clock synchronized with GPS time and uses the signal transmitted by the array along with the transmission time information encoded in the signal to accurately measure the ranges to each of the elements of the array. The underwater receiver also decodes the array position and attitude information present in signal. By combining the ranging information, which determines the position of the receiver relative to the array, with the received absolute array position and attitude information, the underwater receiver calculates its own absolute position. Once the absolute position is available, the underwater receiver can easily implement all the functionality expected from a modern GPS receiver, such as, for example recording tracks, marking and navigating to waypoints, displaying location on maps, and the like.

In some embodiments, an underwater navigation system is disclosed. The system comprises at least two underwater acoustic transmitters transmitting position information and timing information. The underwater acoustic transmitters form an array having a rigid structure. The system further comprising at least one underwater receiver receiving the transmitted position information and timing information from each underwater acoustic transmitter, and calculating a location based at least in part on the received position information and timing information, where a ratio of a distance between the array and the underwater receiver to a greatest distance between any two of the at least two underwater acoustic transmitters in the array is greater than 10:1. In another embodiment, the ratio is greater than 100:1. In a further embodiment, the ratio is greater than 1000:1.

In other embodiments, an underwater receiver for use in an underwater navigation system is disclosed. The receiver comprises a hydrophone, where the hydrophone receives an acoustic transmission from each of a plurality acoustic transmitters. The plurality of acoustic transmitters forms an array having a rigid structure. The acoustic transmissions comprise position information and timing information, and the timing information is based at least in part on a time-base. Further, a ratio of a distance between the array and the hydrophone to a greatest distance between any two transmitters of the plurality of acoustic transmitters in the array is greater than 10:1.

In yet other embodiments, an underwater navigation system is disclosed. The underwater navigation system comprises a plurality of acoustic transmitters forming an array having a rigid structure and a location-determination unit that provides location information of the acoustic transmitters. Each of the acoustic transmitters transmits a respective navigation signal. The navigation signal referenced to a first time-base. The navigation signal comprises first data and the first data describes a location of one or more of the acoustic transmitters. The system further comprises a receiver comprising a hydrophone and a clock synchronized with the time-base. The receiver configured to use the time-base and data from the hydrophone to estimate a range to each of the acoustic transmitters. The receiver further configured to decode the first data and configured to use the estimated range to each of the acoustic transmitters and at least a portion of the first data to compute a location of the receiver. A ratio of a distance between the array and the receiver to a baseline of the array is greater than 10:1.

In further embodiments, a method for underwater navigation is disclosed. The method comprises receiving a GPS signal, and transmitting acoustic signals from a plurality of underwater acoustic transmitters. The plurality of underwater acoustic transmitters forms an array having a rigid structure. The acoustic signals synchronized at least in part with a time-base obtained from the GPS signal. The acoustic signal further comprises location information of the underwater acoustic transmitters. The method further comprises receiving at a receiver the acoustic signals as received acoustic signals, where a ratio of a distance between the array and the receiver to a baseline of the array is greater than 10:1, and computing an underwater location at least in part using data from the received acoustic signals.

In another embodiment, a method of navigating underwater is disclosed. The method comprises forming a plurality of underwater acoustic transmitters into an array having a rigid structure and receiving position information and timing information from each underwater acoustic transmitter at an underwater receiver, where the underwater receiver calculates its absolute position based at least in part on the position information and the timing information. Further, a ratio of a distance between the array and the underwater receiver to a greatest distance between any two of the plurality of underwater acoustic transmitters in the array is greater than 10:1.

Certain embodiments relate to a method of navigating underwater. The method comprises forming a plurality of underwater acoustic transmitters into an array. The array has a rigid structure. The method further comprises receiving an acoustic signal from each underwater acoustic transmitter at an underwater receiver, where the underwater receiver calculates its relative position to the underwater acoustic transmitter based at least in part on the timing information. A ratio of a distance between the array and the underwater receiver to a greatest distance between any two of the plurality of underwater acoustic transmitters in the array is greater than 10:1.

According to a number of embodiments, the disclosure relates to a transmitter for use in an underwater navigation system. The transmitter comprises at least two underwater acoustic transducers transmitting position information and timing information to an underwater receiver. The underwater acoustic transducers form an array having a rigid structure. The underwater receiver calculates a location based at least in part on the transmitted position information and timing information; and a ratio of a distance between the array and the underwater receiver to a greatest distance between any two of the at least two underwater acoustic transducers in the array is greater than 10:1.

For purposes of summarizing the disclosure, certain aspects, advantages and novel features of the embodiments have been described herein. It is to be understood that not necessarily all such advantages may be achieved in accordance with any particular embodiment of the invention. Thus, the inventions may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers are re-used to indicate correspondence between referenced elements. The drawings, associated descriptions, and specific implementation are provided to illustrate embodiments of the invention and not to limit the scope of the disclosure.

DETAILED DESCRIPTION OF THE PREFERRED EMBODIMENT

The features of the inventive systems and methods will now be described with reference to the drawings summarized above.

Figure 1:
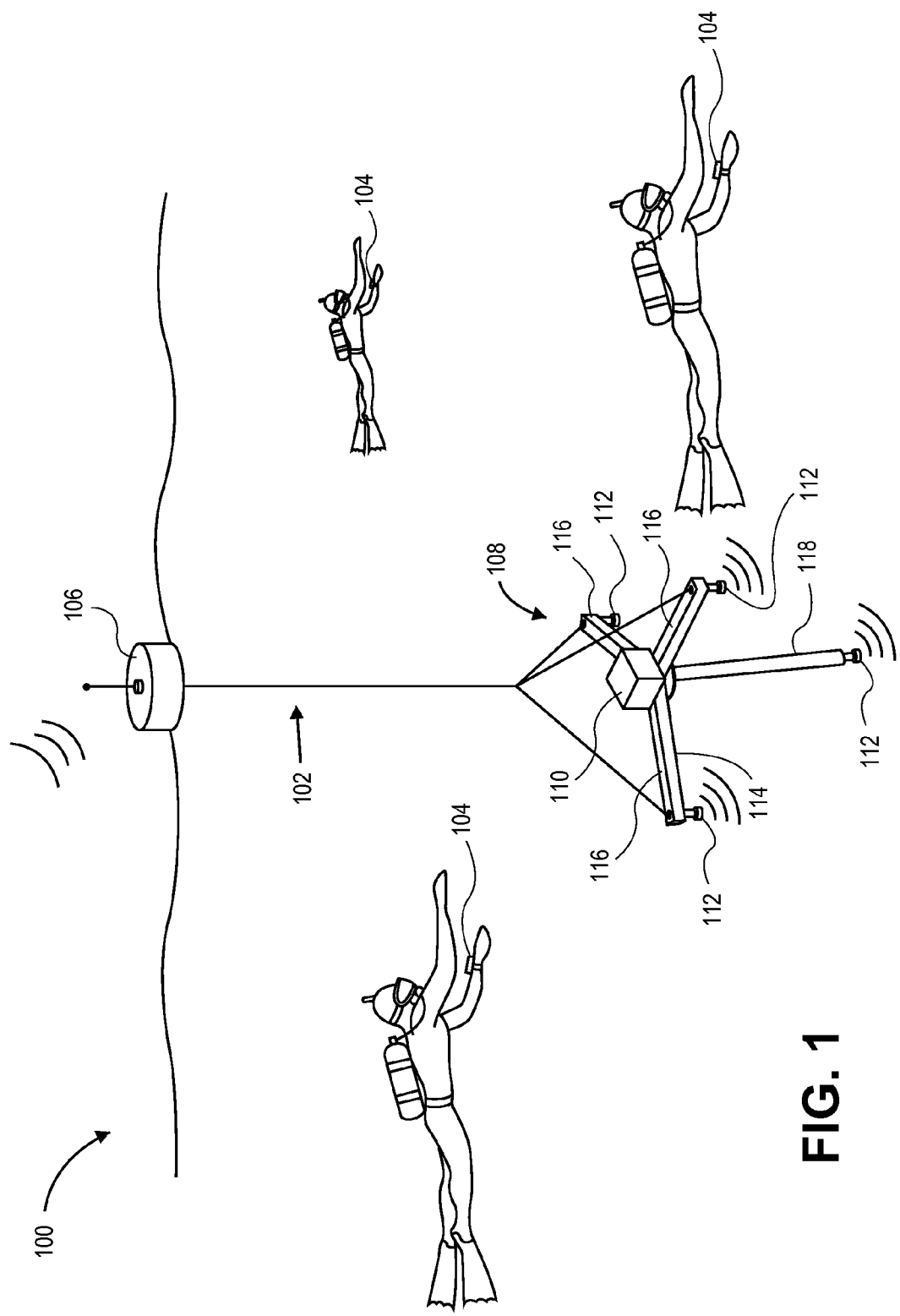
FIG. 1 illustrates an underwater acoustic navigation system, according to certain embodiments.

FIG. 1 illustrates an embodiment of an underwater acoustic navigation system 100, according to certain embodiments. The system comprises a transmitter unit 102 and at least one underwater receiver 104. Because GPS signals are not available underwater, the system 100 functions through the transmitter unit 102 that deploys a transmit array 108 into the water. In an embodiment, the transmitter unit 102 deploys into the water near the surface of the water. The transmitter unit 102 has a radio antenna to receive signals in order to determine its location, and transmits to the underwater receivers 104 via the underwater transmit array 108, using acoustic signals. In an embodiment, the acoustic signals are navigational signals. As a result of receiving these acoustic/navigational signals, the underwater receivers 104 have their azimuth, elevation and range from the transmit array 108, as well as the location of the transmitter unit 102 and the attitude of the transmit array 108. Using this information, the underwater receivers 104 calculate their own absolute position, independent of the position or motion of the transmitter unit 102. In an embodiment, the underwater receiver 104 displays its position as latitude and longitude values. In another embodiment, the underwater receiver displays its position as a dot on a map.

The transmitter unit 102 comprises an electronics module 106 and the transmit array 108. In an embodiment, the electronics module 106 is hung from the side of a boat or a buoy. In another embodiment, the electronics module 106 is mounted on a boat. In an embodiment, the electronics module 106 comprises a waterproof enclosure and/or a float or other buoyant member to permit the electronics module 106 to remain above the surface of the water.

The transmit array 108 comprises a sensor module 110, a plurality of acoustic transducers 112, and a rigid frame 114. The transmit array 108 is suspended below the surface of the water and connected with a cable to the electronics module 106. In an embodiment, the depth of the array 108 is easily adjustable. In an embodiment, an adjustable device, such as, for example, a reel, or the like, is used to adjust the depth of the array 108 in the water.

Suspending the array 108 closer to the surface makes it more likely that large near-surface temperature gradients will cause a shadow zone within the normal operational range of the system. On the other hand, the deeper the array 108 is in the water, the more susceptible it is to horizontal offset due to winds or currents. Since the array 108 is assumed to be directly below the electronics module 106, any horizontal offset between the two may result in errors in the absolute position estimates made by the receivers 104. Thus, in windier or high current conditions when large near-surface temperature gradients are unlikely to develop because of mixing, the array 108 can be suspended at a relatively shallow depth to minimize the horizontal offset between the electronics module 106 and the array 108. Conversely, in calm conditions when horizontal offset is less of a problem, the array 108 can be suspended deeper to avoid large near-surface temperature gradients that may develop. In an embodiment, the array 108 is preferably suspended between approximately 5 and approximately 25 feet below the electronics module 106, and more preferably, between approximately 5 and approximately 10 feet below the electronics module 106.

The rigid frame 114 of the array 108 comprises three support members 116 joined in a spoke configuration such that they form an angle of approximately 120° with each other and are located in a plane parallel to the surface of the water, in an embodiment. In another embodiment, the frame 114 comprises less than three support members 116 and the angles between the coplanar support members 116 can be greater than 120° or less than 120°. In a further embodiment, the frame 114 comprises more than three support members 116 and the angles between the coplanar support members 116 can be greater than 120° or less than 120°.

The rigid frame 114 further comprises a fourth support member 118 which joins the 3 coplanar support members 116 at the hub of the spoke configuration. The fourth support member 118 forms an angle of approximately 90° with each of the three coplanar support members 116 and is located below the plane formed by the three coplanar support members 116. In an embodiment, the support members 116, 118 are between approximately 12 inches and approximately 36 inches long. In another embodiment, the support members 116, 118 are between approximately 6 inches and approximately 60 inches long. More preferably, the support members 116, 118 are approximately 18 inches long. The support members 116, 118 are made of materials that resist salt water corrosion, such as, for example, stainless steel, aluminum, brass, fiber-reinforced polymer, plastic, high density polyethylene, polyvinyl chloride, polypropylene, and the like.

In another embodiment, the rigid frame 114 comprises more than four support members 116, 118. In a further embodiment, the rigid frame 114 comprises less than four support members 116, 118.

The transducers 112 mount on the rigid frame 114 at a far end of each support member 116, 118, away from the hub of the spoke configuration and electrically connect to the sensor module 110. The baseline of the array 108, which is the greatest distance between any two of the transducers 112 in the array 108, is much less than the distance between the array 108 and the underwater receiver 104. In an embodiment, a ratio of the distance between the array 108 and the underwater receiver 104 to the baseline of the array 108 is greater than 10:1. In another embodiment, the ratio is greater than 100:1. In a further embodiment, the ratio is greater than 1000:1. These embodiments differ from an USBL tracking system in that the receiver 104 calculates its position directly rather than having its position transmitted to it by the USBL tracking system.

The sensor module 110 mounts on the rigid frame 114 at the hub of the spoke-configured support members 116. The sensor module 110 electrically connects to each of the transducers 112 and the electronics module 106.

Figure 2:
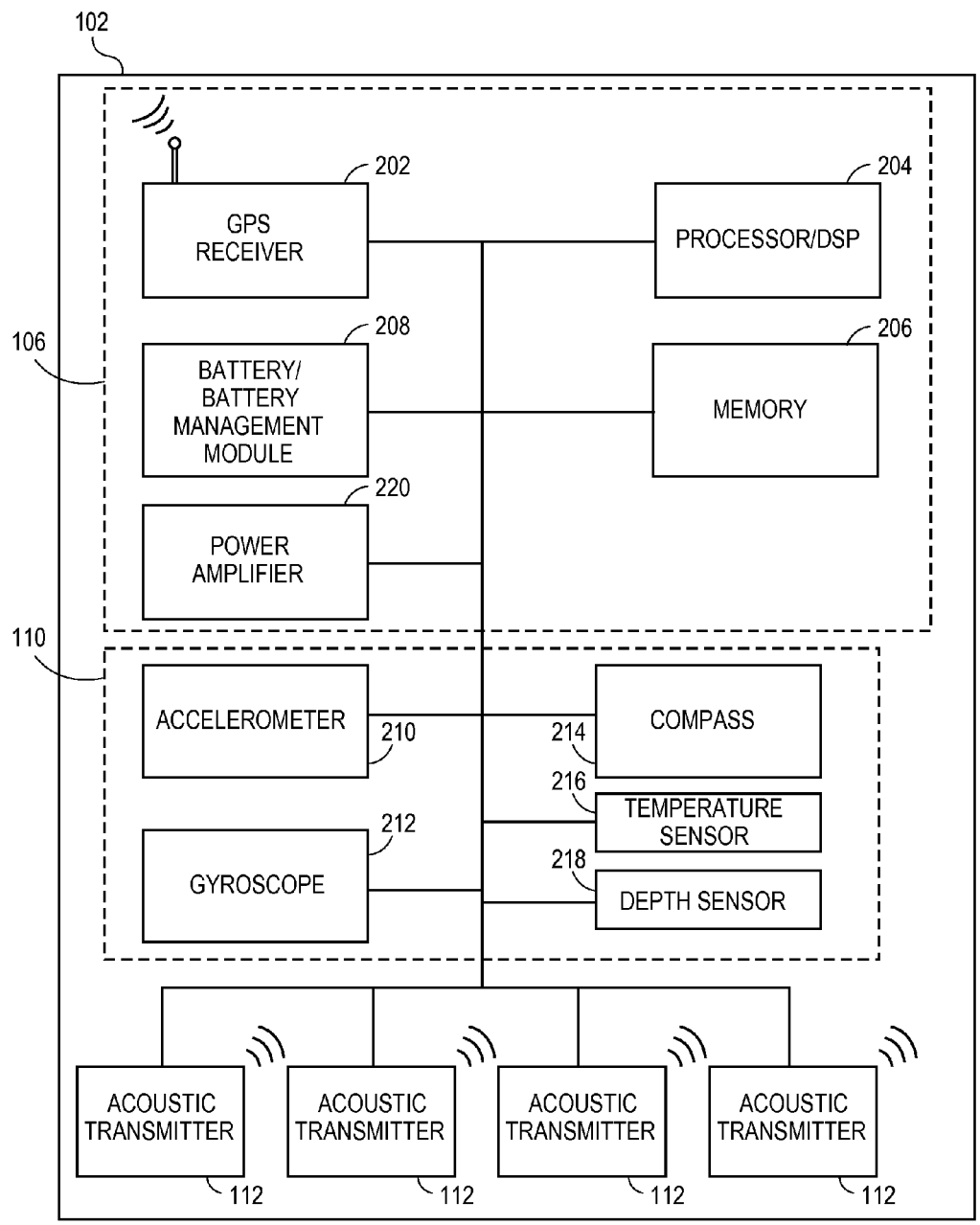
FIG. 2 illustrates a block diagram of an exemplary transmitter unit, according to certain embodiments.

FIG. 2 illustrates a block diagram of an exemplary transmitter unit 102, comprising the electronics module 106, the sensor module 110, and the plurality of acoustic transducers 112. The electronics module 106, the sensor module 110 and the transducers 112 are configured to communicate electronically with one another. In an embodiment, the electronics module 106 comprises a GPS receiver 202, a computer 204, memory 206, a battery/battery management module 208, and power amplifiers 220.

The Global Positioning System (GPS) is a satellite-based navigation system made up of a network of satellites orbiting the earth and transmitting signals. The GPS receiver 202 locks onto the signal of at least three GPS satellites to calculate its latitude, longitude, and altitude. The GPS receiver 202 is located above the water to receive the satellite signals. The GPS receiver provides latitude, longitude, and altitude data, as well as date, time and status data to the computer 204. In an embodiment, the GPS receiver 202 comprises a pulse-per-second logic output for synchronization purposes. In an embodiment, the GPS receiver 202 is a commercially available GPS receiver, such as, for example, Fastrax Model Number UP501, Globalsat EM-406A, or the like.

The computer 204 comprises, by way of example, processors, program logic, or other substrate configurations representing data and instructions, which operate as described herein. In other embodiments, the processor 204 can comprise controller circuitry, processor circuitry, processors, general-purpose single-chip or multi-chip microprocessors, digital signal processors, embedded microprocessors, microcontrollers, and the like. The computer 204 receives position and timing data from the GPS receiver 202 and the sensor module 110 and encodes the data for transmission to the underwater receivers 104 via the acoustic transducers 112. Examples of computers 204 are, Analog Devices Model Number ADSP-BF512, Texas Instruments Model Number TMS320C55x, or the like.

The memory 206 can comprise one or more logical and/or physical data storage systems for storing data and applications used by the computer 204.

The battery/battery management module 208 comprises a battery which powers the transmitter unit 102 and further comprises electronic circuitry configured to manage the battery, such as charge controllers, power supplies, and the like, as is known to one of ordinary skill in the art. The power amplifier 220 provides signal amplification as is known to one of ordinary skill in the art.

The sensor module 110 comprises inertial measurement devices, and other sensors, such as magnetometers, depth sensors, water temperature sensors and the like, that allow calculation of the altitude and depth of the array 108 as well as the acoustic propagation characteristics of the water near the array. Inertial measurement devices measure accelerations and angular rates to calculate attitude. In an embodiment, the sensor module 110 comprises at least one accelerometer 210, at least one gyroscope 212, at least one magnetometer 214, at least one temperature sensor 216 and at least one depth sensor 218. In another embodiment, the sensor module 110 comprises at least two accelerometers 210, at least two gyroscopes 212, and at least two magnetometers 214. Other embodiments do not comprise temperature sensors 216 and/or depth sensors 218. In other embodiments, different combinations of accelerometers 210, gyroscopes 212, compasses/magnetometers 214, temperature sensors 216 and depth sensors 218 comprise the sensor module 110.

The accelerometer 210 detects magnitude and direction of acceleration and provides the magnitude and the direction of the acceleration to the computer 204. The accelerometer 210 can be, for example, Analog Devices Model Numbers ADXL345, ADXL103, ADXL203, or the like.

The gyroscope 212 detects angular rates and also provides the angular rates to the computer 204. The gyroscope 212 can be, for example, Analog Devices Model Number ADXRS620, Analog Devices Model Number ADIS16060, Linear Technology Model Number LYPR540AH, or the like.

The compass/magnetometer 214 measures the magnitude and direction of the Earth's magnetic field and provides the magnitude and direction to the computer 204. The compass 214 can be an electronic compass, a digital compass, a magnetometer, or the like. The magnetometer 214 can be part of an integrated compass module. Examples of the magnetometer 214 are Honeywell Model Number HMC5843, Honeywell Model Numbers HMC1051/HMC1052/HMC1053, Linear Technology Model Number LSM303DLH, or the like.

The temperature sensor 216 determines the ambient temperature of the water surrounding the array 108 and provides temperature data to the computer 204. The temperature sensor 216 can be, for example, Vishay Model Number 2381 645 20, Cantherm MF52, EPCOS 657540, or the like.

The depth sensor 218 measures the depth of the array 108 and provides depth data to the computer 204. Examples of depth sensors are Measurement Specialties Model 86, Honeywell Model G, or the like.

In other embodiments, other combinations of sensors, such as for example a sound velocity sensor, a sound velocity profiler, a salinity sensor, a barometric pressure sensor, and the like, can be used to provide position data to the computer 204 and/or data used to compensate for variations caused by external conditions, such as water temperature, pressure, salinity variations, weather conditions, and the like.

The acoustic transducers 112 convert an electrical signal, such as the encoded position/attitude and timing data from the GPS receiver 202 and the sensor module 110 into an acoustic signal. The acoustic transducers 112 are, for example, Sensor Technologies Model Number SX30, or the like.

Since RF signals from GPS satellites do not propagate through water, the role of the transmitter unit 102 is to receive the satellite signals with the standard GPS receiver 202 that is above the surface and then broadcast acoustic signals underwater that can be used by underwater receivers 104 to determine their absolute location. To achieve absolute positioning, the underwater receiver 104 knows both the absolute position of the transmitter unit 102 and its own position (azimuth, elevation, and range) relative to the transmitter unit 102. Relative positioning is accomplished by transmitting signals from the array 108 of transducers 112 such that the underwater receiver 104 can measure the propagation delay to each individual transducer 112 and calculate its azimuth, elevation, and range relative to the array 108. The signals broadcast by the individual transducers 112 together encode information about the absolute position and attitude of the array 108.

An embodiment provides a positioning accuracy of approximately 3 m within approximately 300 m of the transmitter unit 102, and approximately 10 m to approximately 1 km with a portable transmitter unit 102 and small wrist-mounted receiver, such as the underwater receiver 104. In an embodiment, encoding the position and attitude of the array 108 uses approximately 100 to approximately 200 bits per second of information. In another embodiment, based on transducer size, power, array baseline and propagation loss, the frequency band is approximately 20 kHz to approximately 100 kHz. An embodiment preferably uses approximately a 400 bit per second (bps) data rate and transmits in approximately the 20-40 kHz band.

The signals transmitted from the array 108 support two competing uses, accurate ranging (time delay estimation) and data transmission. Signals typically used for accurate ranging such as pings, chirps and pseudorandom binary sequences are not suitable for transmitting the required amount of information over the underwater acoustic channel. Signals commonly used for data transmission underwater such as frequency shift keying (FSK) or quadrature phase shift keying (QPSK) with intersymbol interference (ISI) equalizers or orthogonal frequency-division multiplexing (OFDM) do not allow sufficient ranging accuracy. To avoid these issues, an embodiment uses binary orthogonal signaling with a very low data rate-to-bandwidth ratio (r/w<<1). This type of signal supports the data rate and is amenable to accurate ranging by using correlation-based integrate-and-dump detectors in delay-locked tracking loops. It also has the benefit of being reasonably immune to the ISI, multipath, and Doppler spreading present in the underwater acoustic channel.

Figure 3:
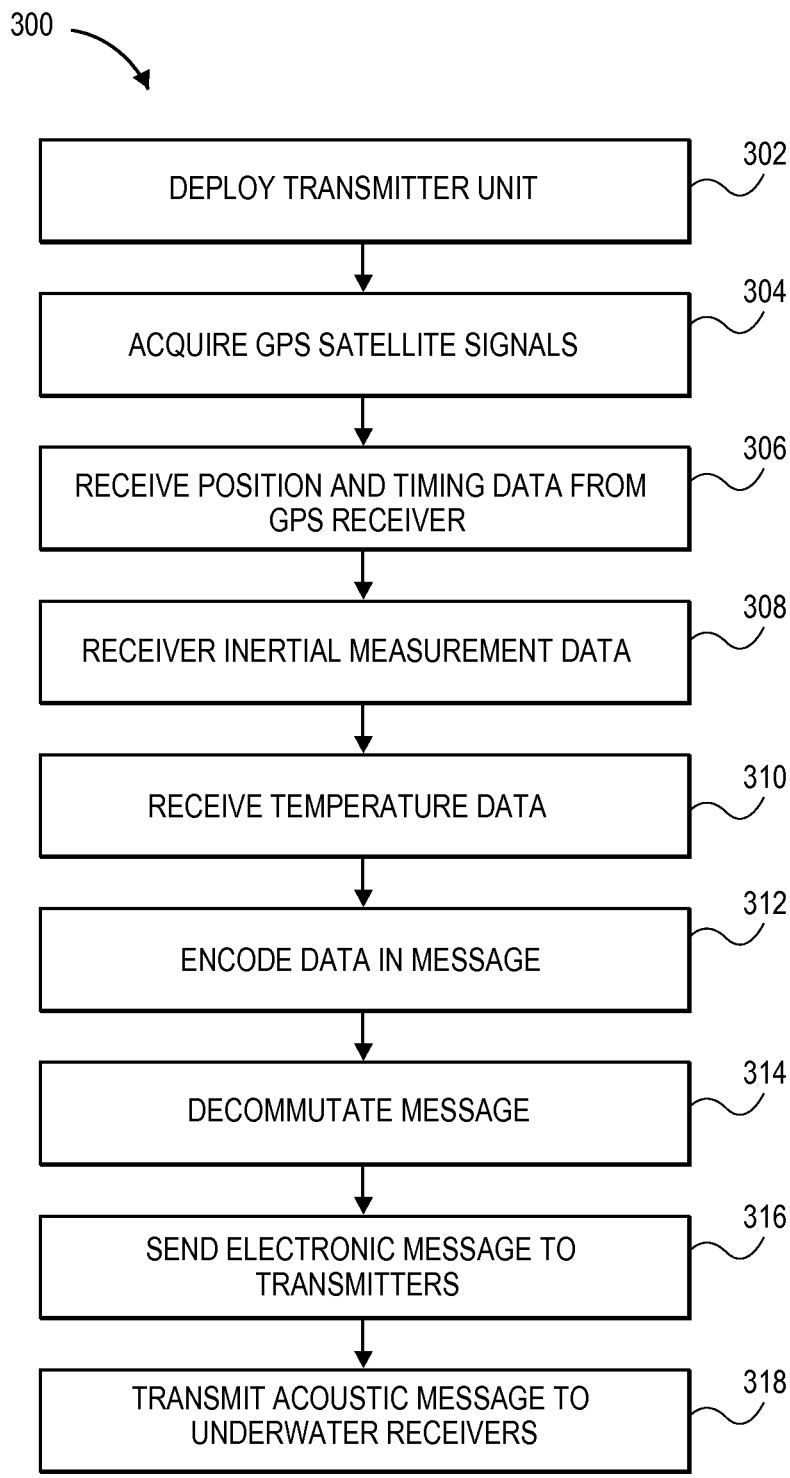
FIG. 3 illustrates a flowchart of an exemplary process for providing an acoustic signal to underwater receivers, according to certain embodiments.

FIG. 3 illustrates a flowchart of an exemplary process 300 for providing an acoustic signal suitable for determining position to underwater receivers 104. For exemplary purposes, the process 300 will be described with reference to the components of the system 100 of FIG. 1.

The process 300 begins at State 302, where the process 300 deploys the transmitter unit 102. The electronics module 106 remains above the water, while the array 108 submerges. As discussed above, the user submerges the array 108 to the desired depth, based at least in part on water and weather conditions.

At State 304, the GPS receiver 202 acquires the GPS satellite signals. Once the GPS receiver 202 acquires the GPS satellite signals, the GPS satellite signals provide the GPS receiver 202 with a valid position fix (longitude, latitude, and altitude) and an absolute time reference (GPS time). GPS time is a standardized time scale that is managed by the US Navel Observatory and used throughout the GPS system.

At State 306, the computer 204 receives position and timing data. In an embodiment, the computer 204 receives longitude, latitude, and altitude data from the GPS receiver 202. In addition, the GPS receiver 202 sends GPS time and status data, such as for example, estimated position error, number of satellites in view, signal strength, and the like, to the computer 204. In an embodiment, the time data is the information associated with the GPS time. In an embodiment, the GPS receiver 202 comprises a pulse per second (PPS) output, which pulses at the start of a GPS second. In an embodiment, the PPS output is accurate to within approximately +/−1 μsec of the GPS second.

At State 308, the computer 204 receives inertial and magnetometer measurement data associated with the attitude of the array 108 from the accelerometers 210 and the gyroscopes 212, and the magnetometers 214. At State 310, the computer 204 receives temperature data of the water surrounding the array 108 from the temperature sensor 216.

At State 312, the computer 204 processes the received data and formats a data message. In an embodiment, the data message is a 200 bit compressed data message that is generated once per second. Further, at State 312, the data message is encoded with an error correcting code. In an embodiment, the data message is encoded with a low-density parity check code to create a 400 bit message. The process 300 then synchronizes the encoded message with GPS time.

At State 314, the process 300 decommutates the message into four 100 bit per second data streams, and at State 316, the process 300 sends the first data stream to the first transmitter 112, the second bit stream to the second transmitter 112, the third bit stream to the third transmitter 112, and the fourth bit stream to the fourth transmitter. In an embodiment, the computer 204 sends each respective bit stream simultaneously to each of the respective transmitters 112.

At State 318, the acoustic transmitters 112 receive the modulated signals comprising positioning data and timing information, and convert the electrical signal into acoustic waves, which are then acoustically transmitted to the underwater receivers 104.

Figure 4:
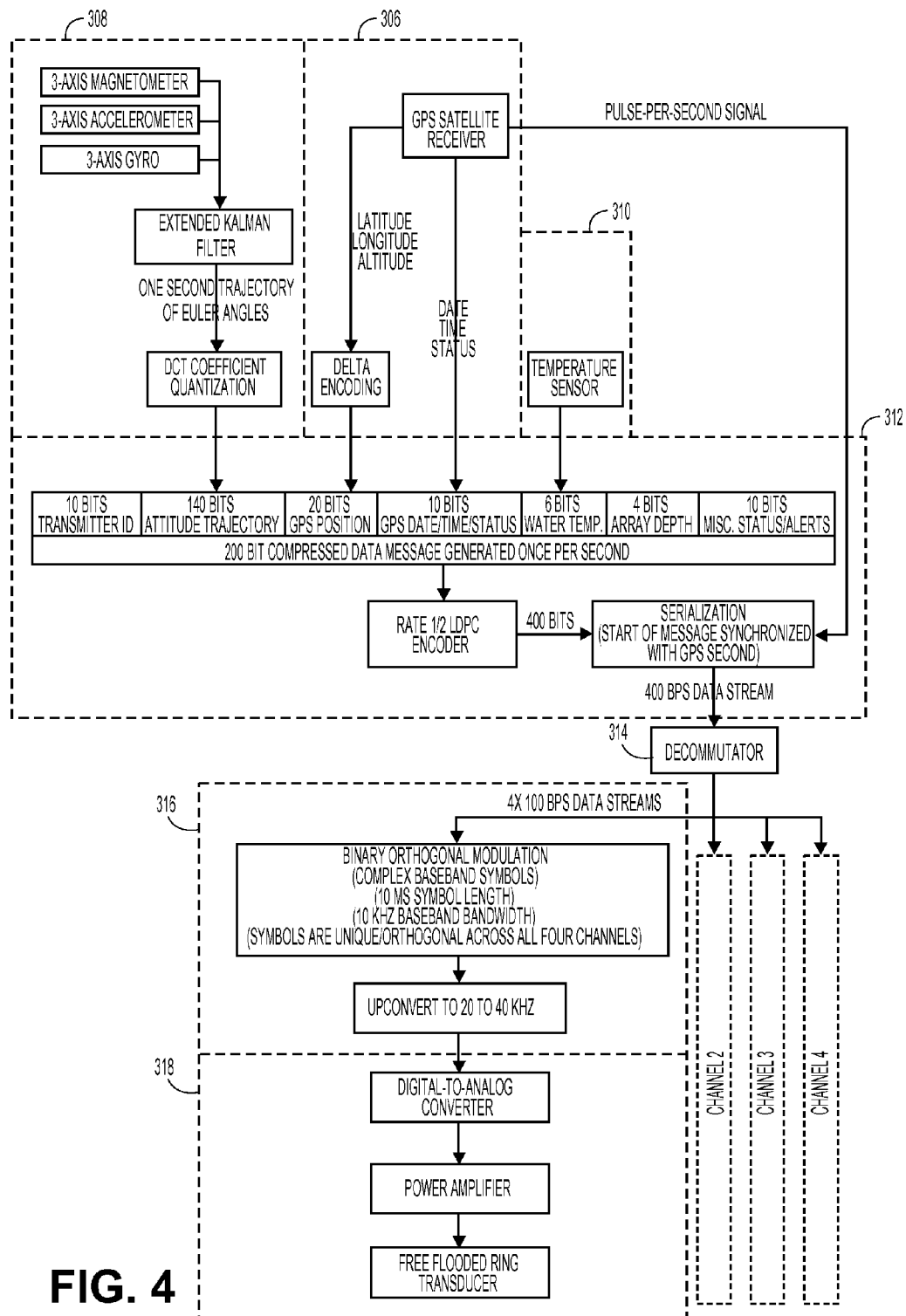
FIG. 4 is a flow diagram illustrating data processing steps for the process of FIG. 3, according to certain embodiments.

FIG. 4 is a flow diagram illustrating additional details of the data processing steps 306-318 of FIG. 3, according to certain embodiments. The blocks of FIG. 4 correspond with the process steps of FIG. 3. Referring to block 306 of FIG. 4, the processor 204 receives both position fixes and pulse-per-second (PPS) pulses from the GPS receiver 202. In an embodiment, the process 300 delta encodes the GPS coordinates into approximately 20 bits.

Referring to block 308 of FIG. 4, the processor 204 also receives raw data from the sensors 210, 212, 214 on the array 108 and uses an extended Kalman filter to fuse the data from the AHRS sensors 210, 212, 214 and generate an estimate of the attitude of the array 108. In an embodiment, the computer 204 computes attitude trajectory information for a one second interval based on information from the sensor module 110 in an Euler angle format and compresses the Euler angles using direct cosine transform (DCT) coefficient quantization into approximately 150 bits.

Referring to block 310 of FIG. 4, the processor further receives the temperature data from the temperature sensor 216 and encodes the temperature data into approximately 6 bits.

Referring to block 312 of FIG. 4, the position and attitude data are compressed and combined with other status and calibration information into a 200 bit message. In an embodiment, the 200 bit message comprises a 10 bit transmitter ID, 140 bits of attitude trajectory data, 20 bits of GPS position data, 10 bits of GPS time/date/status data, 6 bits of water temperature data, 4 bits of array depth data, and 10 bits of miscellaneous status/alert data. The 200 bit message is then block-encoded. In an embodiment, a (400, 200) low-density parity check (LDPC) encoder (code rate of 1/2), creates a 400 bit message. The 400 bit encoded message is then serialized such that the start of the message is synchronized with the GPS second.

Referring to block 314 of FIG. 4, the 400 bps data stream is decommutated into four 100 bps data streams.

Referring to Block 316 of FIG. 4, the decommutated data streams are modulated and transmitted to the four transducers 112. In an embodiment, the system 100 uses binary orthogonal signaling with a low data rate-to-bandwidth ratio (r/w<<1). The symbols used in the binary orthogonal signaling are unique and orthogonal across the four transmit channels so that the signals from the individual transducers 112 can be easily distinguished by the underwater receiver 104. The system 100 uses the PPS signal from the GPS receiver 202 to trigger transmission of each one second block in sync with the GPS second. Each channel is upconverted to between approximately 20 kHz and approximately 40 kHz.

Referring to block 318 of FIG. 4, each transducer 112 converts its modulated data signal to an analog signal, which is acoustically transmitted. In an embodiment, the transducers 112 are free flooded ring transducers.

The acoustically transmitted signals from the transducers 112 are received by the underwater receiver 104 and used by the underwater receiver 104 to determine its absolute position. To calculate its absolute position, in an embodiment, the underwater receiver 104 uses azimuth and elevation relative to the array 108, distance from the array 108, absolute attitude of the array 108, and absolute position of the array 108.

In an embodiment, the azimuth, elevation, and distance relative to the array 108 uniquely determine the three dimensional position of the underwater receiver 104 in an array-fixed coordinate system. The absolute position and attitude of the array 108 uniquely determine the coordinate transform necessary to convert array-fixed coordinates into an earth-fixed or geodetic coordinate system. Azimuth and elevation relative to the array 108 can be determined from the relative arrival times of the signals from the individual transducers 112 in the array with no absolute time reference. In an embodiment, the transmit signals are transmitted at known/fixed GPS times such that the receiver 104 can use the absolute time-of-arrival measurement in GPS time to determine distance between the array 108 and the underwater receiver 104. In other embodiments, the underwater receiver 104 knows its depth and can determine distance without synchronizing to GPS time.

Figure 5:
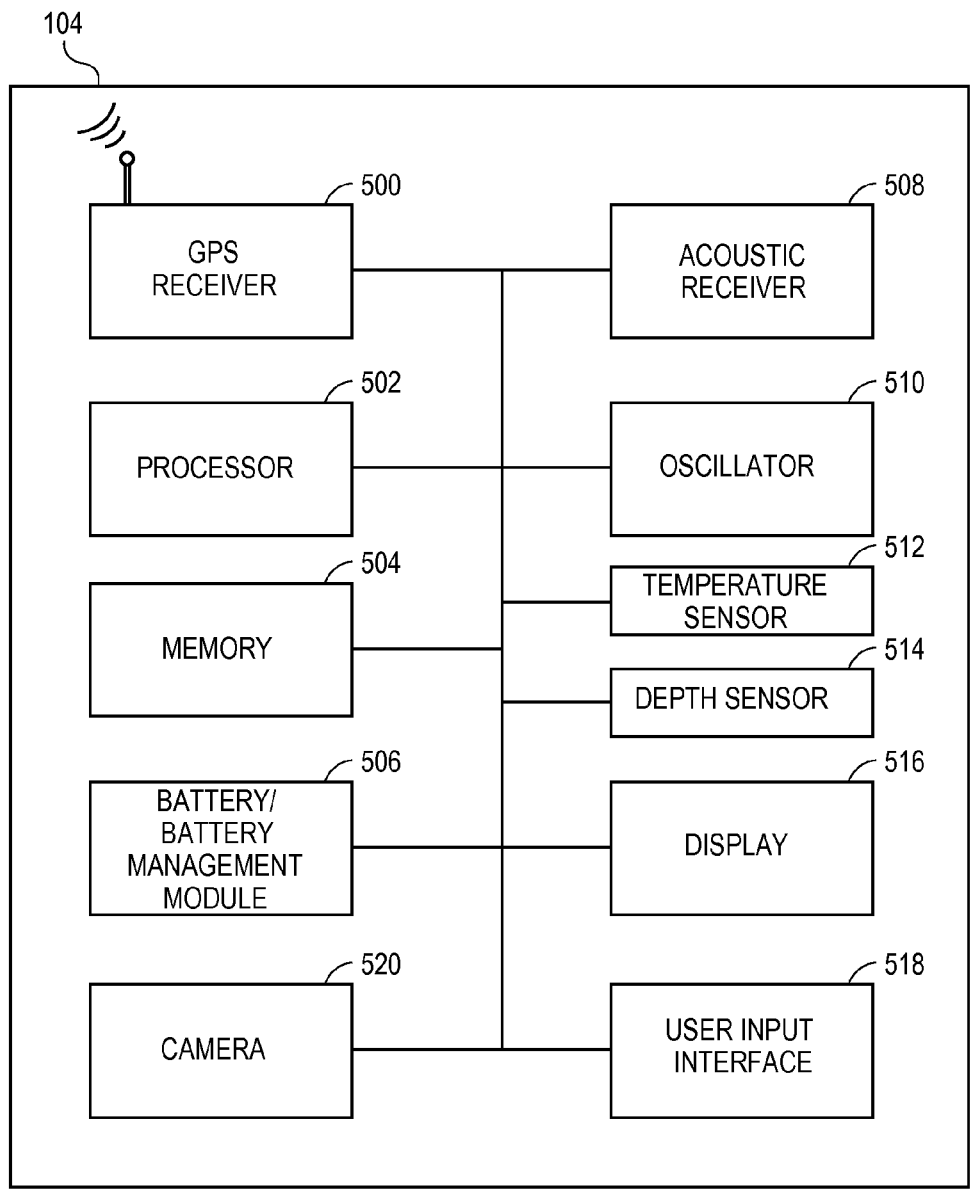
FIG. 5 illustrates a block diagram on an exemplary underwater receiver, according to certain embodiments.

FIG. 5 illustrates a block diagram of an exemplary underwater receiver 104. In an embodiment, the underwater receiver 104 comprises a GPS receiver 500, a computer 502, memory 504, a battery/battery management module 506, an acoustic receiver 508, an oscillator, 510, a temperature sensor, 512, a depth sensor 514, a display 516, and an interactive user interface 518.

As discussed above, to achieve absolute positioning, the underwater receiver 104 knows both the absolute position of the transmitter unit 102 and its own position relative to the transmitter unit 102. In an embodiment, relative positioning is accomplished by transmitting signals from the array 108 of transducers 112 such that the underwater receiver 104 can measure the propagation delay to each individual transducer 112 and calculate its azimuth, elevation, and range relative to the array 108.

In an embodiment, to accurately measure the propagation delay of the received acoustic signals when the underwater receiver 104 is underwater, the GPS receiver 500 synchronizes with the GPS time before the underwater receiver 104 is deployed. While above water, the underwater receiver 104 acquires the GPS signals, which provide an accurate absolute time reference. In an embodiment, the GPS time reference is indicated by GPS seconds. Because both the transmitter unit 102 and the underwater receiver 104 acquire the GPS time reference from the GPS, both GPS receivers 202, 500 are synchronized with each other. The GPS receiver 500 can be, for example, Trimble Condor Model Number C1011, NavSync Model Number CW20, u-blox Model Number AMY-5M, u-blox Model number NEO-6, or the like. In an embodiment, the GPS receiver 500 outputs the digital pulse per second (PPS) signal which provides a pulse at the start of the GPS second.

Using the PPS output of the GPS receiver 104, the underwater receiver synchronizes the time and frequency of the oscillator 510 with GPS time. Once the clock synchronizes, the underwater receiver 104 can be deployed and the underwater receiver 104 uses the oscillator signal to calculate the propagation delay. When underwater, the oscillator 510 goes into a free-running mode and clock drift will begin to accumulate between the oscillator 510 and GPS time. Clock drift causes an error when measuring the absolute arrival time of the signals and therefore an apparent change in distance from the transmitter. The allowable clock drift rate depends on the required positioning accuracy as well as the expected maximum time underwater. For example, a +/−0.5 ppm temperature compensated crystal oscillator gives a maximum distance error of approximately 2.7 meters per hour underwater. In an embodiment, the oscillator 510 is a temperature compensated crystal oscillator, such as for example, Conner-Winfield Model Number D32G, Pletronics TCD4012, or the like.

The depth sensor 514 measures the depth of the underwater receiver 104 and provides depth data to the computer 502. In an embodiment, the underwater receiver 104 can deduce its position relative to the array 108 using the depth data, without synchronizing to GPS time before deployment. The depth data, when combined with the known position, depth, and attitude of the array and the azimuth and elevation (note that range is not used in this case) relative to the array 108, determines the absolute position of the array. As the angle between the line from the array to the receiver and the vertical line passing through the array approaches 90 degrees, the accuracy of this method decreases. Examples of depth sensors are Measurement Specialties Model 86, Honeywell Model G, or the like.

The computer 502 comprises, by way of example, processors, program logic, or other substrate configurations representing data and instructions, which operate as described herein. In other embodiments, the processors 502 can comprise controller circuitry, processor circuitry, processors, general-purpose single-chip or multi-chip microprocessors, digital signal processors, embedded microprocessors, microcontrollers, and the like. The computer 502 receives the acoustic signal from the transmitter unit 102, decodes the array position and attitude information, and calculates the position of the underwater receiver 104. Examples of computers 502 are Texas Instruments Model Number OMAP3530, Analog Devices ADSP-BF533, or the like.

The memory 504 can comprise one or more logical and/or physical data storage systems for storing data and applications used by the computer 502. Examples of memory 504 are Micron Model Number MT29C2G48MAKCJI-6 or the like.

The battery/battery management module 506 comprises a battery, such as a lithium ion battery, which powers the underwater receiver 104 and further comprises electronic circuitry configured to manage the battery, such as charge controllers, power supplies, and the like, as is known to one of ordinary skill in the art. Examples of power management devices are Texas Instruments Model Number BQ24075RGT, Linear Technology Model Number LTC2942CDCB, or the like.

The acoustic receiver 508 receives the acoustic signals transmitted by the transducers 112 and converts the sound waves into an electrical signal comprising the encoded position, and timing information. In an embodiment, the acoustic receiver 508 is a hydrophone. Examples of hydrophones 508 are Reson Model Number TC 4013, Reson Model Number TC4040, or the like.

The temperature sensor 512 determines the ambient temperature of the water surrounding the underwater receiver 104 and provides temperature data to the computer 502. The temperature sensor 512 can be, for example, Vishay Model Number 2381 645 20, Cantherm MF52, EPCOS B57540, or the like.

The optional display 516 displays the calculated position information to the user, in an embodiment. The display 516 can be, for example, CMEL Model Number P0340WQLC-T, Samsung Model Number S6E63D6, or the like. The display 516, in an embodiment, displays the location of other underwater receivers 104, maps, and position information, such as heading, latitude, and longitude, of the underwater receiver 104.

The optional user input interface 518 comprises, for example, user input selectors, communication ports, and the like. In an embodiment, the user input selectors permit the user to zoom in or out on the display, and mark a current location. Communication ports, such as a universal serial bus (USB) port permit the user to download underwater maps into the underwater receiver 104 for display to the user. Other examples of optional ports comprise a Bluetooth port, a battery recharging port, and the like.

In another embodiment, the underwater receiver 104 further comprises an optional camera. Examples of cameras 520 are Samsung SX5433M14X-X0B0, 1 Ltd 1AF-S85M65, and the like.

Figure 6:
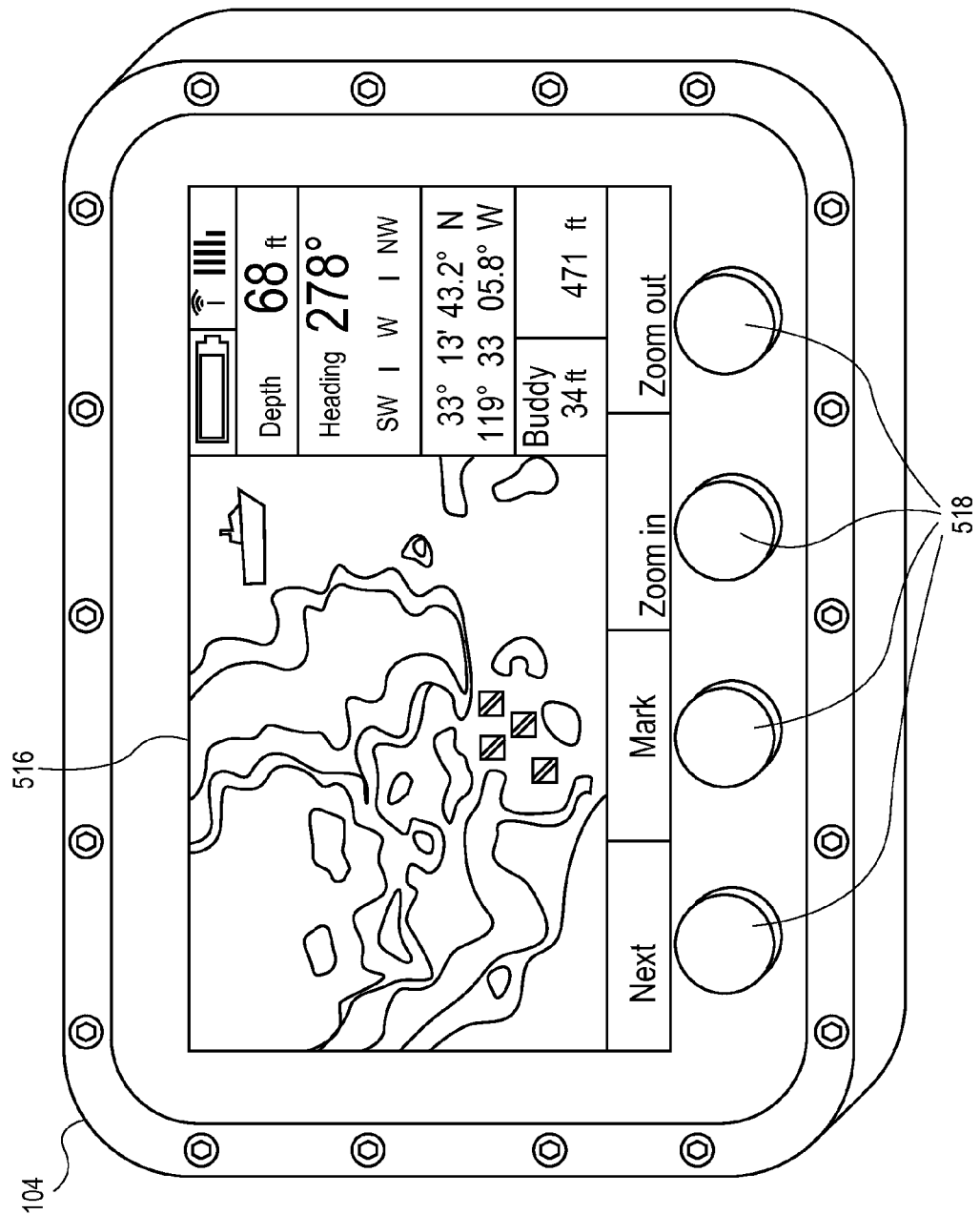
FIG. 6 illustrates an embodiment of the underwater receiver of FIG. 5.

FIG. 6 illustrates an embodiment of the underwater receiver 104 comprising the optional display 516 and the optional user input selectors 518. In an embodiment, the underwater navigation system 100 can download contour maps of underwater terrain through an optional port, such as a USB port on the underwater receiver 104. In other embodiments, the underwater receiver 104 can receive, through the optional USB port, and display additional information on the display 516, such as local fish species, information on local wrecks or formations, and the like. In another embodiment, the underwater receiver 104 broadcasts a low power position signal such that other nearby underwater receivers 104 can receive the signal and display the location of the nearby underwater receiver 104. In an embodiment, the underwater receiver 104 can receive the low-power broadcast signals from up to approximately 100 meters away.

In the illustrated embodiment, the display 516 displays an underwater map with the locations of other nearby underwater receivers 104, the location of a boat associated with the transmitter unit 102, the heading, the depth, the latitude, and the longitude of the underwater receiver 104. In the illustrated embodiment, the user input selectors 518 permit the user to mark a current location on the displayed map, or increase/decrease the size of the displayed map.

Figure 7:
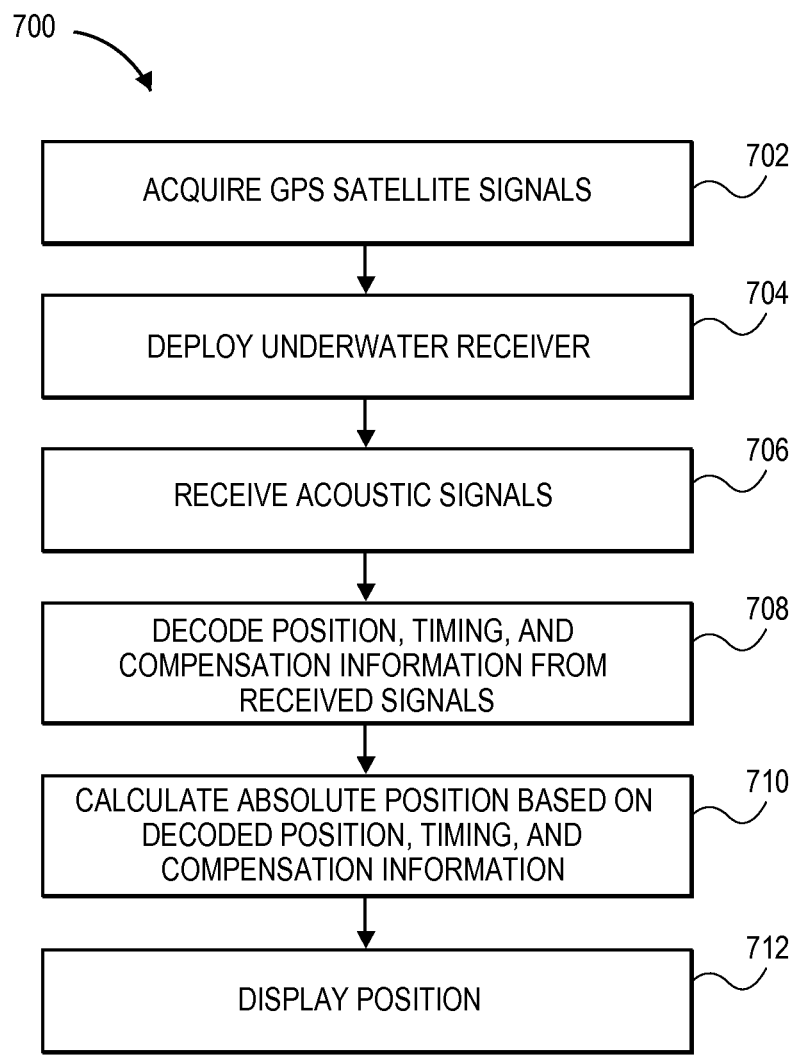
FIG. 7 illustrates a flowchart of an exemplary process for computing an underwater location, according to certain embodiments.

FIG. 7 illustrates a flowchart of an exemplary process 700 for computing an underwater location, according to certain embodiments. For exemplary purposes, the process 700 will be described with reference to the components of the system 100 of FIG. 1 and the underwater receiver 104 of FIG. 5.

The process 700 begins at State 702, where the GPS receiver 500 powers up and acquires the GPS satellite signals. Once the GPS receiver 500 acquires the GPS satellite signals, the GPS satellite signals provide the GPS receiver 500 with a valid position fix (longitude, latitude, and altitude) and an absolute time reference (GPS time). As discussed above, GPS time is a standardized time scale that is managed by the US Navel Observatory. The GPS receiver 500 via the PPS output signal sends the GPS time signal to the oscillator 510.

At State 704, the process 700 deploys the underwater receiver 104. At State 706, the underwater receiver 104 receives acoustic signals from each of the transducers 112 of the transmitter unit 102. The acoustic signals comprise acoustically encoded position and timing information. The acoustic receiver 508 converts the sound waves into an electrical signal comprising encoded position, and timing information. The process 700 downconverts the encoded signal to a baseband signal.

At State 708, in the illustrated embodiment, the process 700 generates four channels of data, one per transducer 112 on the array 108, from the baseband signal. In the illustrated embodiment, the process generates four 100 bps data streams from the broadband signal. Further at State 708, the process 700 commutates the data streams to generate a message. In an embodiment, the message is a 200 bit message.

At State 710, the computer 502 receives the message comprising the encoded array position, array attitude, and timing information, calculates the position of the underwater receiver 104 relative to the array 108, and based on the decoded array position and attitude information, transforms the relative position into absolute geodetic coordinates. At State 712, the underwater receiver 104 displays the geodetic coordinates on the display 516.

Figure 8:
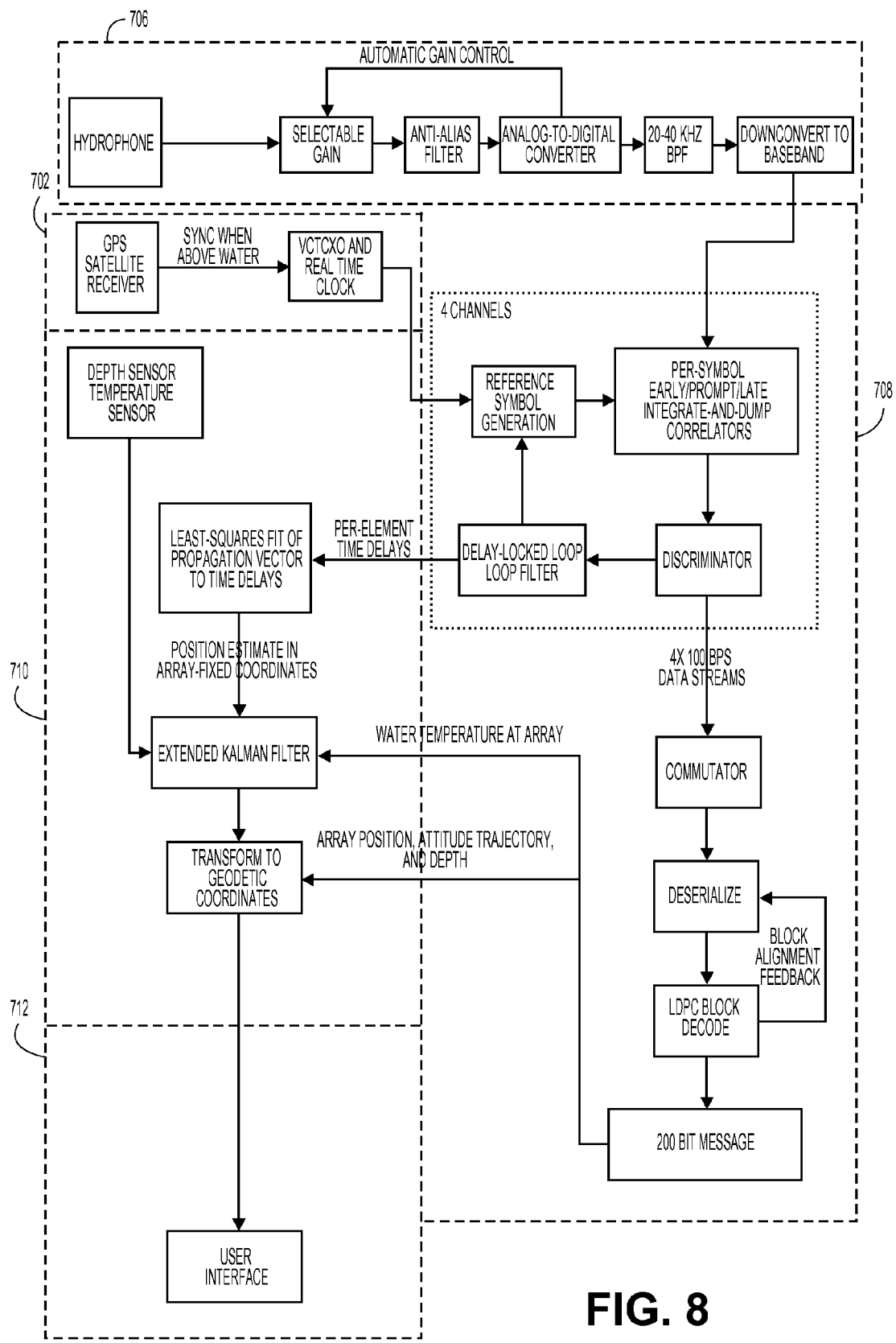
FIG. 8 is a flow diagram illustrating data processing steps of the process of FIG. 7, according to certain embodiments.

FIG. 8 is a flow diagram illustrating additional details of the data processing steps 702-710 of FIG. 7, according to certain embodiments. The blocks of FIG. 8 correspond with the process steps of FIG. 7. Referring to block 702 of FIG. 8, the GPS receiver 500 receives the GPS satellite signals when above the water and provides the PPS output to the oscillator 510. In an embodiment, the oscillator 510 is a voltage-controlled temperature compensated crystal oscillator (VCTCXO and real-time clock synchronized to GPS time) 510. The real time clock is used by the processor 502 as an absolute time reference when measuring the propagation delay of the signals from the transducers 112.

Referring Block 706 of FIG. 8, after deploying the underwater receiver 104, the acoustic receiver 508 receives the signals from each of the acoustic transducers 112. The signals are filtered to reduce aliasing of the signals and converted to a digital signal. The digital signal is band-pass filtered to create a data signal in the range of approximately 20 kHz to approximately 40 kHz and downconverted to baseband.

Referring to Block 708 of FIG. 8, the underwater receiver 104 simultaneously detects the arrival time and data content of the signals using a bank of early/prompt/late integrate-and-dump correlators to provide delay feedback to a delay-locked loop, according to an embodiment. The encoded position and timing information is decoded for each channel to provide four bit streams of approximately 100 bits per second. The four bit streams are commutated and deserialized to create a single message stream. After decoding the message stream with a low density parity check (LDPC) decoder to correct for errors caused by transmitting through a noisy transmission channel, such as the water, the process 700 provides a message of approximately 200 bits. This decoded 200 bit message mirrors the 200 bit message encoded in the transmitter unit 102, as shown in FIG. 4. Thus, in an embodiment, the 200 bit message comprises a 10 bit transmitter ID, 140 bits of attitude trajectory data, 20 bits of GPS position data, 10 bits of GPS time/date/status data, 6 bits of water temperature data, 4 bits of array depth data, and 10 bits of miscellaneous status/alert data.

Referring to Block 710 of FIG. 8, the processor 502 uses the 200 bit message data and the delay information from the delay-locked loop to calculate the position of the underwater receiver 104 relative to the array 108. In an embodiment, the delay between the transmissions of the transducers 112 is processed using a least-squares fit to provide a position estimate in array-fixed coordinates. After filtering with an extended Kalman filter, according to an embodiment, the process 700 transforms the position data from array-fixed coordinates to earth-fixed or geodetic coordinates using the absolute array position and attitude decoded from the data stream. Additional calibration information from the data stream such as array depth and water temperature is used to correct errors and improve the position estimate.

Referring to Block 712 of FIG. 8, the processor 500 displays the geodetic coordinates on the display 516. In an embodiment, the display 516 displays longitude, latitude and heading, as illustrated in FIG. 6.

While the embodiments have been described with respect to calculating the absolute position of the underwater receiver 104, other embodiments are used to track the underwater receiver 104. In one tracking embodiment, the system 100 operates as described above and the receiver 104 calculates its position. The position is then transmitted back to the surface via a data link, such as, for example, electrically via a cable, acoustically via an acoustic data link, or the like.

In another embodiment, the absolute position of the receiver 104 is known at the transmitter unit 102 and not at the receiver 104. The acoustic signals may not comprise encoded data as described above, although it may be useful to encode a limited amount of data, such as a unique identifier or timestamp. Further, the receiver clock may not be synchronized with an absolute time reference because the range from the transmitter unit 102 can be determined from the round trip time for the receiver 104 to receive the acoustic signal and reply via the data link back to the transmitter unit 102. The receiver 104 then does not calculate its absolute position. Instead the receiver 104 communicates a more limited form of information such as relative time delays, azimuth and elevation, or relative position to the transmitter unit 102 and the remaining processing necessary to determine the absolute position of the receiver 104 is done by the transmitter unit 102.

In another embodiment, a display located on a dive boat equipped with the array 108 tracks the location of a plurality of underwater units 104.

In another embodiment, the underwater receivers 104 communicate with one another acoustically using signals that are different than the acoustic signals transmitted by the transmitter unit 102 that are used for positioning. The communication between receivers 104 can be used to convey information about their position, or additional information such an SOS or request for assistance or information about the air supply, decompression time of a diver, or the like. Thus, providing the system 100 with the ability to locate and provide the location on the display of other nearby underwater receivers 104. In an embodiment, the low-level transmitter permits the underwater receiver 104 to send an SOS alert to other nearby underwater receiver 104, or other message.

In yet another embodiment, a compass is integrated into the underwater receiver 104. The compass allows easy navigation to locations and allows a displayed map to be automatically oriented north.

In a further embodiment, the underwater receiver 104 does not comprise the display 516, but provides communication to a remote display. In an embodiment, the external display is an external dive computer. In another embodiment, the display-less underwater receiver 104 may be advantageously combined with commercially available dive computers to provide navigation functionality.

In an embodiment, the display-less underwater receiver 104 may be advantageously placed on the diver's back instead of being worn like a watch on the diver's wrist. Placing the receiver 104 on the diver's back permits the receiver 104 to comprise a larger battery allowing for a greater transmit range and/or longer usage time. Further, because people tend to wave their arms about, the receiver 104 on a diver's wrist tends to move around more than the receiver 104 on a diver's back. More receiver motion makes it more difficult for the receiver 104 to receive the acoustic signals. Thus, the receiver 104 on the diver's back is in a better position for acoustic reception than the receiver 104 on the diver's wrist.

In a further embodiment, the underwater receiver 104 does not comprise the display 516, but provides an electrical connection or other interface to connect it with, for example, an unmanned underwater vehicle or remotely-operated underwater vehicle.

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. An underwater receiver for determining underwater locations of at least two divers, the underwater receiver comprising:
    a hydrophone configured to receive an acoustic transmission from one or more acoustic transmitters of a plurality acoustic transmitters, the plurality of acoustic transmitters forming an array having a rigid structure and configured to be suspended underwater, wherein a baseline of the array is less than and including approximately 2 meters, and wherein the one or more acoustic transmissions comprise position information of the array, attitude data of the array, and timing information;
    computer hardware configured to determine, based at least in part on an absolute-time reference and the timing information, an arrival time of each of the one or more acoustic transmissions, and to use a statistical fit algorithm to determine position data of a first diver in array-fixed coordinates based at least in part on the arrival times, the position data in array-fixed coordinates determining a distance of the first diver from the array;
    the computer hardware further configured to transform the position data of the first diver from the array-fixed coordinates to geodetic coordinates based at least in part on the position information of the array and the attitude data of the array;
    the computer hardware further configured to determine a location of a second diver based at least in part on receipt of acoustic signals that are different from the acoustic transmissions from the one or more acoustic transmitters; and
    a display to display the position data of the first diver and the location of the second diver.

2. The underwater receiver of claim 1 wherein the timing information is based at least in part on a time-base.

3. The underwater receiver of claim 2 further comprising an oscillator configured to receive a signal associated with the time-base prior to the hydrophone receiving the one or more acoustic transmissions to provide a source of the timing information.

4. The underwater receiver of claim 1 wherein the statistical fit algorithm comprises a least squares fit algorithm.

5. The underwater receiver of claim 1 further comprising one or more sensors configured to output temperature data, salinity data, and depth data.

6. The underwater receiver of claim 5 wherein the statistical fit algorithm uses the temperature data, the salinity data, and the depth data to refine the position data of the first diver.

7. The underwater receiver of claim 1 wherein a ratio of a distance between the array and the hydrophone to a greatest distance between any two acoustic transmitters of the plurality of acoustic transmitters in the array is greater than 10:1.

8. The underwater receiver of claim 1 wherein the attitude data comprises at least one of angular magnitude and direction of acceleration of the array, an angular rate of the array, magnitude and direction of the Earth's magnetic field near the array, ambient temperature of water surrounding the array, and depth of the array.

9. The underwater receiver of claim 1 wherein the computer hardware is further configured to calculate azimuth, elevation, and range relative to the array based at least in part on the arrival times to determine a relative position to the array.

10. The underwater receiver of claim 9 wherein the computer hardware is further configured to determine the absolute position based at least in part on the relative position, the attitude data, and the position information.

11. A method comprising:
receiving underwater at a receiver an acoustic transmission from one or more acoustic transmitters of a plurality acoustic transmitters, the plurality of acoustic transmitters forming an array having a rigid structure and configured to be suspended underwater, wherein a baseline of the array is less than and including approximately 2 meters, and wherein the one or more acoustic transmissions comprise position information of the array, attitude data of the array, and timing information;
determining an arrival time of each of the one or more acoustic transmissions based at least in part on an absolute-time reference and the timing information;
using a statistical fit algorithm to determine position data in array-fixed coordinates based at least in part on the arrival times, the position data in array-fixed coordinates determining a distance of the first diver from the array; and
transforming the position data from the array-fixed coordinates to geodetic coordinates based at least in part on the position information of the array and the attitude data of the array.

12. The method of claim 11 wherein the statistical fit algorithm comprises a least squares fit algorithm.

13. The method of claim 11 further comprising receiving temperature data, salinity data, and depth data from one of more sensors.

14. The method of claim 13 wherein the statistical fit algorithm uses the temperature data, the salinity data, and the depth data to refine the position data.

15. The method of claim 11 further comprising synchronizing to the time base to provide the absolute-time reference.

16. A receiver for use in an underwater navigation system, the receiver comprising:
a hydrophone configured to receive an acoustic transmission from one or more acoustic transmitters of a plurality acoustic transmitters, the plurality of acoustic transmitters forming an array having a rigid structure and configured to be suspended underwater, wherein a baseline of the array is less than and including approximately 2 meters, and wherein the one or more acoustic transmissions comprise position information of the array, attitude data of the array, and timing information; and
computer hardware configured to determine, based at least in part on an absolute-time reference and the timing information, an arrival time of each of the one or more acoustic transmissions, to use a statistical fit algorithm to determine position data in array-fixed coordinates based at least in part on the arrival times, and to transform the position data from the array-fixed coordinates to geodetic coordinates based at least in part on the position information of the array and the attitude data of the array.

17. The receiver of claim 16 further comprising a clock configured to synchronize to the time-base and provide the absolute-time reference.

18. The receiver of claim 17 wherein the clock synchronizes to the time-base before deploying the hydrophone under water.

19. The receiver of claim 16 wherein the statistical fit algorithm comprises a least squares fit algorithm.

20. The receiver of claim 16 wherein the statistical fit algorithm uses temperature data, salinity data, and depth data from one or more sensors to refine the position data.

* * * * *